United States Patent [19]

Matsuoka et al.

[11] Patent Number: 4,969,438
[45] Date of Patent: Nov. 13, 1990

[54] IGNITION TIMING CONTROLLER FOR AN INTERNAL COMBUSTION ENGINE

[75] Inventors: Atsuko Matsuoka; Toshio Iwata, both of Himeji, Japan

[73] Assignee: Mitsubishi Denki Kabushiki Kaisha, Tokyo, Japan

[21] Appl. No.: 484,967

[22] Filed: Feb. 26, 1990

[30] Foreign Application Priority Data

Feb. 27, 1989 [JP] Japan ................................. 1-43325

[51] Int. Cl.⁵ .......................... F02P 5/15; F02P 7/06
[52] U.S. Cl. .................................. 123/418; 123/414
[58] Field of Search ............... 123/414, 415, 416, 417, 123/418, 422, 609; 364/431.07

[56] References Cited

U.S. PATENT DOCUMENTS

| | | | |
|---|---|---|---|
| 3,910,243 | 10/1975 | Gau et al. | 123/415 |
| 4,112,895 | 9/1978 | Habert | 123/414 X |
| 4,138,976 | 2/1979 | Crall | 123/414 X |
| 4,231,091 | 10/1980 | Motz | 123/414 X |
| 4,893,244 | 1/1990 | Tang et al. | 123/416 X |

FOREIGN PATENT DOCUMENTS 227874  9/1989  Japan ................................. 123/414

Primary Examiner—Tony M. Argenbright
Attorney, Agent, or Firm—Sughrue, Mion, Zinn, Macpeak and Seas

[57] ABSTRACT

An ignition timing controller for an internal combustion engine calculates a first ignition delay time and generates an ignition signal when the first delay time has elapsed subsequent to a prescribed first piston position of the engine. When a second position occurs before the first delay time has elapsed, the first delay time of replaced by a second delay time measured from the second piston position, and an ignition signal is generated when the second delay time elapses. An igniter ignites a cylinder of the engine when the ignition signal is generated.

5 Claims, 2 Drawing Sheets

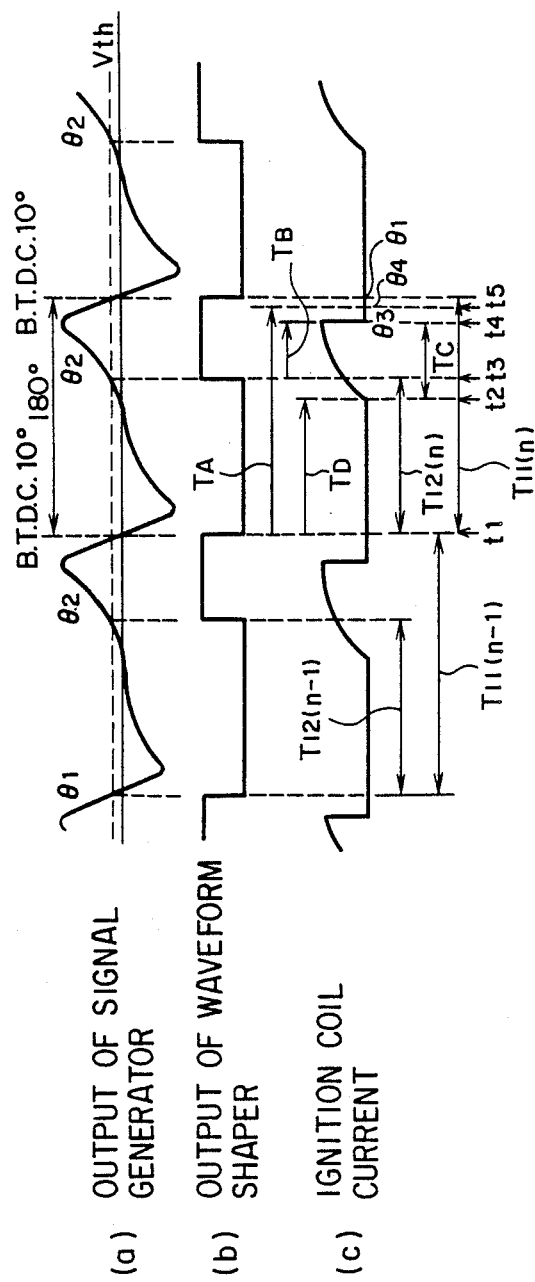

IGNITION TIMING CONTROLLER FOR AN INTERNAL COMBUSTION ENGINE

BACKGROUND OF THE INVENTION

This invention relates to an ignition timing controller for an internal combustion engine. More particularly, it relates to an ignition timing controller which can prevent late ignition when the engine speed suddenly increases.

In an internal combustion engine, it is important that ignition take place in each cylinder when the piston of that cylinder is at a prescribed angular position. The angular position of a piston at the time of ignition is normally controlled so as to vary with the rotational speed of the engine. When the engine rotational speed is constant or is gradually changing, conventional ignition timing controllers can accurately control the ignition timing so as to occur at the correct piston position. However, when the engine rotational speed suddenly increases, in conventional ignition systems, there is a tendency for ignition to take place late, resulting in problems such as misfiring.

SUMMARY OF THE INVENTION

Accordingly, it is an object of the present invention to provide an ignition timing controller for an internal combustion engine which can accurately control the ignition timing even when the engine rotational speed suddenly increases.

It is another object of the present invention to provide a method for controlling the ignition timing of an internal combustion engine.

An ignition timing controller according to the present invention includes an ignition timing calculator which receives an input signal indicating prescribed first and second piston positions with respect to top dead center of each piston of the engine. Based on the input signal, the ignition timing calculator calculates a delay time and generates an ignition signal when the delay time has elapsed as measured from one of the piston positions.

The ignition timing calculator calculates a first delay time and generates an ignition signal when the first delay time elapses as measured from the first piston position, provided that the second piston position has yet to occur. However, if the second piston position occurs before the first delay time elapses, the calculator replaces the first delay time with a second delay time and generates an ignition signal when the second delay time elapses as measured from the second piston position. In a preferred embodiment, the calculator comprises a microcomputer.

An ignition timing control method according to the present invention comprises the steps of calculating target ignition timing for each cylinder of an engine, calculating a first delay time from a prescribed first piston position based on the target ignition timing, generating an ignition signal if the first delay time has elapsed since the first piston position before the occurrence of a prescribed second piston position, calculating a second delay time from the second piston position based on the target ignition timing and the length of time from the first to the second piston positions if the ignition signal has not been generated by the second piston position, and generating an ignition signal when the second delay time as measured from the second piston position has elapsed.

BRIEF DESCRIPTION OF THE DRAWINGS

FIGS. 2($a$–$c$) are a wave form diagram showing the output signals of various portions of the embodiment of FIG. 1.

DESCRIPTION OF THE PREFERRED EMBODIMENT

Figure 1:
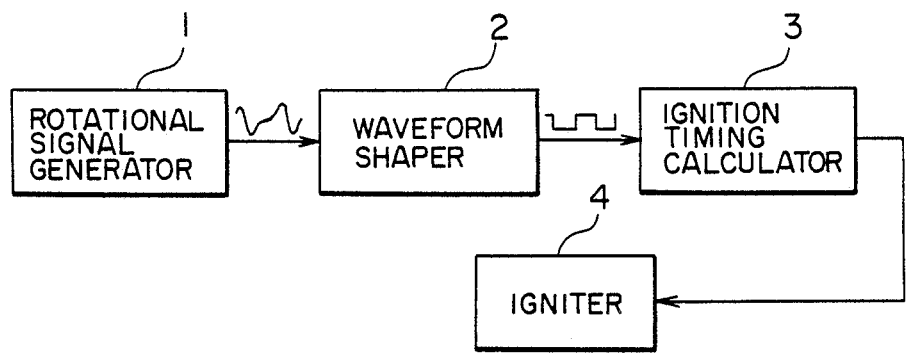
FIG. 1 is a block diagram of an embodiment of an ignition timing controller according to the present invention.
Figure 3:
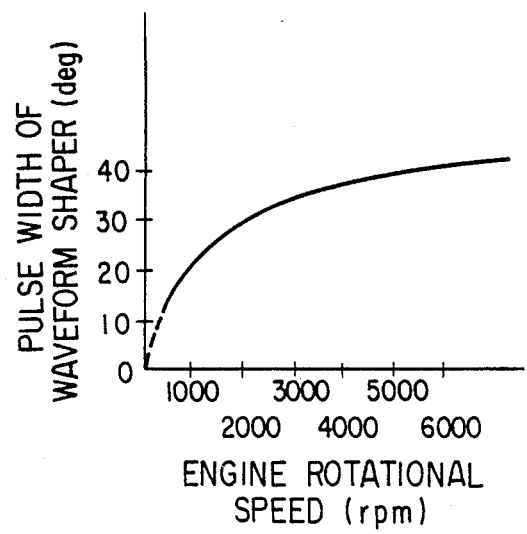
FIG. 3 is a graph showing the pulse width of the output signal of the wave form shaper of FIG. 1 as a function of engine rotational speed.

A preferred embodiment of an ignition timing controller according to the present invention will now be described while referring to the accompanying drawings. FIG. 1 is a block diagram of this embodiment as applied to an unillustrated multi-cylinder internal combustion engine. In this embodiment, the engine has 4 cylinders, but the present invention can be applied to an engine with any number of cylinders. A conventional rotational signal generator 1 generates an output signal in synchrony with the rotations of the engine. The frequency of the output signal of the signal generator 1, an example of which is shown in FIG. 2$a$, is proportional to the rotational speed of the engine. Typically, the rotational signal generator 1 is responsive to the rotation of the crankshaft or the camshaft of the engine. The output signal of the signal generator 1 is input to a wave form shaper 2, which outputs a square wave as shown in FIG. 2$b$. In this example, a falling edge of the square wave occurs when the output signal of the signal generator 1 falls below a reference voltage Vth, while a rising edge occurs when the output signal of the signal generator 1 exceeds the reference voltage. A falling edge of the square wave occurs each time one of the pistons of the engine is at a first piston position $\theta 1$, which in the present embodiment is a constant value of 10° BTDC, although a different value can be used. A rising edge of the square wave occurs each time one of the pistons is at a second piston position $\theta 2$. The rotational signal generator 1 operates such that $\theta 1$ is independent of engine rotational speed, while $\theta 2$ occurs earlier (a greater number of degrees before top dead center) as the engine rotational speed increases. Thus, as shown in FIG. 3, the pulse width of the square wave increases as the engine rotational speed increases.

The output of the wave form shaper 2 is input to an ignition timing calculator 3, which calculates the target ignition timing, i.e., the piston position at which ignition should take place in each cylinder based on the engine rotational speed. The engine rotational speed can be determined from the period or the frequency of the square wave. Algorithms for calculating the target ignition timing are well-known to those skilled in the art, and any suitable algorithm can be employed. At the appropriate time, the ignition timing calculator 3 provides an igniter 4 with an ignition signal, and the igniter 4 controls an unillustrated ignition coil which generates an ignition voltage for the spark plugs of the engine. The ignition timing calculator 3 can be constituted by a microprocessor.

The manner in which the ignition timing calculator 3 determines the ignition timing will be described while referring to FIG. 2. In FIG. 2, t1 indicates the time of a falling edge of the square wave from the wave form shaper 2. First, at a point in time subsequent to time t1 in FIG. 2, the calculator 3 determines the predicted period $T_F$ of the square wave from the wave form shaper 2, i.e., the predicted length of time between t1 and t6 at consecutive falling edges of the square wave. The predicted period $T_F$ can be calculated by the formula $T_F = T_{11(n-1)} + (T_{11(n-1)} - T_{11(n-2)})$, wherein $T_{11(n-1)}$ is the most recent period of the square wave and $T_{11(n-2)}$ is the preceding period of the square wave, as shown in FIG. 2. This formula assumes that the period $T_{11}$ of the square wave is changing in a linear fashion. However, a different formula may be used to calculate the predicted period $T_F$.

The ignition timing calculator 3 determines the engine rotational speed from the period of the square wave, and based on the rotational speed, it determines the target ignition timing $\theta 3$ in a conventional manner. Assuming that the period $T_{11(n)}$ of the square wave will equal the predicted period $T_F$, the ignition timing calculator 3 calculates a first ignition delay time $T_A$, which is the expected length of time from the first piston position $\theta 1$ at time t1 until the target ignition timing $\theta 3$. In a four-cylinder engine in which there are 180° of crankshaft rotation between the power strokes of subsequent cylinders, so the first delay time $T_A$ is given by the formula $$T_A = T_F(180° - \theta 2 + \theta 1)/180°.$$

The length of time $T_C$ for which the unillustrated ignition coil conducts is calculated by the ignition timing calculator 3 in a conventional manner, and based on the calculated value, the ignition timing calculator 3 determines the length of time $T_D$ from time t1 at the falling edge of the square wave until time t2, when the ignition coil begins conducting by the formula $T_D = T_A - T_C$.

At time t1, the ignition timing calculator 3 begins measuring the first delay time $T_A$, and at time t2, the igniter 4 begins supplying current to the ignition coil at time $t1 + T_D = t2$. If the first delay time $T_A$ elapses before the occurrence of the second piston position $\theta 2$ at time t3, it generates an ignition signal at time $t1 + T_A$, and the igniter 4 cuts off the current to the primary winding of the ignition coil to cause ignition to take place.

However, if the second piston position $\theta 2$ occurs before the first delay time $T_A$ has elapsed, the ignition timing calculator 3 then calculates a second ignition delay time $T_B$. This second delay time $T_B$ takes into consideration any changes in the engine rotational speed since time t1 and can be calculated in the following manner:

when $T_A \leq T_{12(n-1)}$ then $T_B = 0$, and when $T_A > T_{12(n-1)}$ then $T_B = (T_A - T_{12(n)})$.

Here, as shown in FIG. 2, $T_{12(n-1)}$ are periods between the first and second piston positions $\theta 1$ and $\theta 2$ for the present square wave and the previous square wave, respectively.

The ignition timing calculator 3 then generates an ignition signal at time $t3 + T_B$ = time t4, wherein time t3 is the time at which the second piston position $\theta 2$ occurs.

If $T_A \leq T_{12(n-1)}$, an ignition signal is sent to the igniter 4 immediately upon a rising edge of the output of the wave form shaper 2, so ignition takes place at the second piston position $\theta 2$. On the other hand, if $T_A > T_{12(n-1)}$, then an ignition signal is sent to the igniter when the second delay time $T_B$ has elapsed as measured from the second piston position $\theta 2$.

FIG. 2c illustrates the effects of the present invention. If the engine speed suddenly increases subsequent to time t1, the first delay time $T_A$ will be too long. If ignition were to take place when the first delay time $T_A$ elapsed, it would occur at piston position $\theta 4$, which is after the target ignition timing $\theta 3$. However, in the present invention, when the second piston position occurs before the first delay time $T_A$ has elapsed, the first delay time $T_A$ is replaced by the second delay time $T_B$, which takes into consideration changes in engine speed occurring after the first delay time $T_A$ was calculated. As a result, ignition takes place at the target ignition timing $\theta 3$, and misfiring and other problems due to late ignition are prevented.

What is claimed is:

1. An ignition timing controller for a multi-cylinder internal combustion engine comprising:
   a reference signal generator for generating a reference signal which changes levels at prescribed first and second positions ($\theta_1$) and ($\theta_2$) of each piston of the engine with respect to top dead center;
   an ignition timing calculator for calculating a target ignition timing ($\theta_A$) corresponding to a certain piston position, calculating a first delay time ($T_A$) from the first piston position based on the target ignition timing, generating an ignition signal when the length of time which has elapsed since the first piston position equals the first delay time if the second piston position has yet to occur, calculating a second delay time ($T_B$) from the second piston position based on the target ignition timing and the length of time from the first to the second piston positions, and generating an ignition signal when the length of time which has elapsed since the second piston position equals the second delay time; and
   an igniter for igniting the engine in response to the ignition signal from the ignition control timing calculator.

2. An ignition timing controller for a multi-cylinder internal combustion engine according to claim 1, wherein the first delay time ($T_A$) is calculated based on a predicted period ($T_F$) between the present to the next points in time at which the first piston position ($\theta_1$) consecutively occurs, and the target ignition timing ($\theta_3$) by using the following formula:

$$T_A = T_F(180° - \theta_3 + \theta_1)/180°$$

3. An ignition timing controller for a multi-cylinder internal combustion engine according to claim 2, wherein the predicted period $T_F$, is calculated as follows:

$$T_F = T_{11(n-1)} + (T_{11(n-1)} - T_{11(n-2)})$$

where $T_{11(n-1)}$ is a presently measured period from the last to the present time points at which the first piston position ($\theta_1$) consecutively occurred, and $T_{11(n-2)}$ is a lastly measured period from the preceding to the last time points at which the first piston position ($\theta_1$) consecutively occurred.

4. An ignition timing controller for a multi-cylinder internal combustion engine according to claim 3, wherein the second delay time ($T_B$) is calculated as follows:

if $T_A \leq T_{12(n-1)}$, then $T_B = 0$ and if $T_A > T_{12(n-1)}$, if $T_A = (T_A - T_{12(n)}) \cdot (T_{12(n)} / T_{12(n-1)})$ where $T_{12(n)}$ is a presently measured length of time from the first to the second piston positions ($\theta_1$), ($\theta_2$) and $T_{12(n-1)}$, is a lastly measured length of time from the first to the second piston positions.

5. An ignition timing control method for a multi-cylinder internal combustion engine comprising:

calculating a target ignition timing ($\theta_3$) corresponding to a certain piston position at which ignition should take place in each cylinder of the engine;

calculating a first delay time ($T_A$) from a prescribed first piston position ($\theta_1$) based on the target ignition timing;

generating an ignition signal when the first delay time as measured from the first piston position has elapsed if a prescribed second piston position ($\theta_2$) has yet to occur;

calculating a second delay time ($T_B$) from the second piston position based on the target ignition timing and the length of time from the first to the second piston positions; and generating an ignition signal when the second delay time as measured from the second piston position has elapsed.

* * * * *